Patented June 19, 1945

2,378,453

UNITED STATES PATENT OFFICE 2,378,453

AZO DYE INTERMEDIATES

Viktor Weinmayr, Pitman, N. J., assignor to E. I. du Pont de Nemours & Company, Wilmington, Del., a corporation of Delaware No Drawing. Application April 16, 1942, Serial No. 439,242

6 Claims. (Cl. 260—578)

This invention relates to new compositions of matter being halogenated phenyl ethanes, particularly phenyl-halogeno ethanes in which at least one of the halogens is fluorine.

It is an object of the invention to produce new and useful intermediates for azo and anthraquinone dyestuffs. Other objects of the invention will be in part apparent and in part set forth hereinafter.

The objects of the invention are accomplished, generally speaking, by subjecting aromatic compounds, having a substituent pentachloro-ethane group, to the action of hydrofluoric acid, preferably anhydrous, at elevated temperatures and preferably at superatmospheric pressures.

A satisfactory temperature for use in the production of these new compounds is about 150° C., under appropriate conditions of time and pressure, but this temperature is by no means a limitation since the process should be operated at that temperature which most efficiently produces the desired end. Some reactions have been found to proceed reasonably well at 100° C.

The pressures which are used in the process of this invention should be those which tend to produce the optimum yields of the desired end product. This will vary somewhat with particular compounds, but in general those pressures which correspond to the temperatures used when the reaction is conducted in a closed vessel are satisfactory.

The starting materials are phenyl-pentachloro-ethanes which may contain such groups as chlorine, alkyl, alkoxy and halogen as substituents in the ring.

The vessels in which the reactions are carried out may be of nickel or of iron and stainless steel. A choice of materials is permitted, but it is to be noted that the reaction is affected by the material with which the reaction vessel is made. For example, when an iron vessel is used, dehalogenation appears to occur first and to be followed by a partial replacement of the remaining chlorines with fluorine. However, the chemist will select the reaction vessel which yields the most satisfactory results in the production of the particular end product which he seeks.

In the formation of the nitro and amino groups variations of the process may be employed, but those which are given as exemplary are satisfactory.

Example I 240 parts of phenyl-pentachloro-ethane and 480 parts of technical anhydrous hydrofluoric acid are charged into a nickel pressure vessel. The temperature is raised gradually over a period of six hours until 150° C. is reached. The charge is agitated at 150–155° C. for six hours, then cooled. The hydrochloric acid formed is released and the charge is poured into ice and water. The reaction product, which precipitates as an oil, is separated, neutralized with aqueous ammonia and given a preliminary purification by steam distillation.

182 parts of wet oil, distilling with about 2000 parts of water, are obtained. The oil is separated, dried with calcium chloride and fractionated.

138 parts of phenyl-trichloro-difluoro-ethane, distilling at 102° C./12 mm. are obtained. This amounts to a yield of 65.4% based on phenyl pentachloro-ethane. The product is a colorless oil of a pleasant odor, and distills at about 223° C. at atmospheric pressure.

Analysis: Cl (found) 43.3%; (calc.) 43.3%.

A small amount of 1', 2', 2'-trichloro-styrene is obtained from the residue when the distillation is continued. If the reaction is carried out in an iron vessel at 150° C., the formation of 1', 2', 2'-trichloro-styrene predominates and some dichloro-monofluoro-styrene, distilling at 75° C./0.7 mm., is formed.

Example II 108 parts of phenyl trichloro-difluoro-ethane are dissolved in 540 parts of about 95% nitric acid at 25–28° C. The solution is agitated at that temperature for approximately ten minutes and then poured into 4000 parts of cold water. The pale yellow precipitate is filtered, washed acid free, and dried at about 50° C.

128 parts of practically pure meta-nitro-phenyl-trichloro-difluoro-ethane (equal to a 100% yield) are obtained. Crystallization from 1.5 parts of ethyl alcohol gives the compound in the form of pale yellow needles, melting at 83–84° C.

Analysis: Cl (found) 36.5%; (calc.) 36.6%; $NO_2$ (by $TiCl_3$) (found) 15.8%; (calc.) 15.8%.

Example III 120 parts of crude meta-nitrophenyl-trichloro-difluoro-ethane are added at 20–30° C. to a slurry of 318 parts of stannous chloride ($SnCl_2.2H_2O$), 238 parts of concentrated hydrochloric acid and 238 parts of dioxane (or an equal amount of ethyl alcohol). The reaction mass is heated to about 80° C. where reduction sets in. The temperature rises without external heating until the reflux temperature of 105° C. is reached. The charge is heated at 105° C. for about an hour after the spontaneous reaction has subsided. The reaction mass is cooled to about 50° C. and poured into the well agitated mixture of 1860 parts of 30% caustic solution and 850 parts of ether. 1200 parts of cold water are added to dissolve the precipitated sodium stannate. The ether layer containing the reaction product is separated, washed with cold water, and dried with calcium chloride and solid sodium hydroxide. The dry ether solution is saturated with dry gaseous hydrogen chloride to precipitate the meta-aminophenyl-trichloro-difluoro-ethane as the hydrochloride. 94 parts of this product are obtained, melting with decomposition at 206° C. This amounts to a yield of 71.9% based on meta-nitrophenyl-trichloro-difluoro-ethane.

To prepare the free base 20 parts of the above hydrochloride are dissolved at 70° C. in 150 parts of water and 15 parts of 28% ammonia are added. The free amine precipitates as an oil which solidifies at about 40° C. 16.7 parts of meta-aminophenyl-trichloro-difluoro-ethane are obtained, melting from 52–53° C. Crystallization from two parts of petroleum ether raises the melting point to 55° C.

Analysis: Cl (found) 40.9%; (calc.) 40.8%; NH$_2$ (by nitrite) (found) 6.13%; (calc.) 6.14%.

The new amino compounds may be diazotized and coupled to appropriate azo dyestuff coupling components and all of the compounds may be used as intermediates for anthraquinone colors.

An advantage of the process is that it produces the new compounds in yields which are reasonably satisfactory.

As many apparently widely different embodiments of this invention may be made without departing from the spirit and scope thereof, it is understood that I do not limit myself to the specific embodiments thereof except as defined in the appended claims.

I claim:
1. A compound consisting of a phenylene radical which is substituted in one position by a difluoro-trichloro-ethane group and in a meta position thereto by a member of the group consisting of hydrogen, nitro and amino.
2. The compound represented by the formula

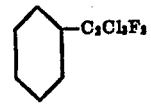

which at atmospheric pressures is a liquid distilling at about 102° C. at 12 mm. pressure.
3. The compound melting at about 83–84° C. represented by the formula

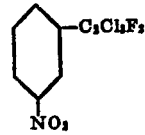

4. The compound melting at about 55° C. represented by the formula

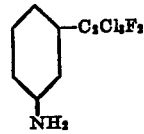

5. The process which comprises making a mixture of phenyl-pentachloro-ethane and an anhydrous hydrofluoric acid, and heating the mixture in a closed non-ferrous vessel above atmospheric pressure at a reaction temperature within the range of 100° C. to about 150° C. until phenyl-trichloro-difluoro-ethane is formed.
6. The process in accordance with claim 5 in which the mixture is heated for about six hours at a maximum temperature which is within the range of 150° C. to 155° C.

VIKTOR WEINMAYR.